(12) United States Patent
Chen

(10) Patent No.: US 10,909,894 B2
(45) Date of Patent: Feb. 2, 2021

(54) DISPLAY PANEL AND TERMINAL

(71) Applicant: Beijing Xiaomi Mobile Software Co., Ltd., Beijing (CN)

(72) Inventor: Chaoxi Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/230,662

(22) Filed: Dec. 21, 2018

(65) Prior Publication Data

US 2019/0311666 A1 Oct. 10, 2019

(30) Foreign Application Priority Data

Apr. 8, 2018 (CN) .......................... 2018 1 0308210

(51) Int. Cl.
*G09G 3/20* (2006.01)
*G01S 7/481* (2006.01)
*G01S 17/08* (2006.01)

(52) U.S. Cl.
CPC .............. *G09G 3/20* (2013.01); *G01S 7/4815* (2013.01); *G01S 7/4816* (2013.01); *G01S 17/08* (2013.01); *G09G 2300/0439* (2013.01); *G09G 2354/00* (2013.01); *G09G 2360/14* (2013.01); *G09G 2360/145* (2013.01)

(58) Field of Classification Search
CPC .............. G09G 3/20; G09G 2360/14; G09G 2360/145; G09G 2354/00; G09G 2300/0439; G01S 17/08; G01S 7/4816; G01S 7/4815; G01S 7/4811; G06F 3/0421; G06F 3/0416; G06F 3/0412

See application file for complete search history.

(56) References Cited

U.S. PATENT DOCUMENTS

| 2008/0122803 | A1 | 5/2008 | Izadi et al. |
| 2008/0150913 | A1* | 6/2008 | Bell ................. G06F 3/0428 345/175 |
| 2011/0050645 | A1* | 3/2011 | Lee .................. G06F 3/042 345/175 |
| 2012/0062817 | A1 | 3/2012 | Kanbayashi et al. |

(Continued)

FOREIGN PATENT DOCUMENTS

| CN | 106298859 | 1/2017 |
| CN | 106850101 A | 6/2017 |

(Continued)

OTHER PUBLICATIONS

Extended European Search Report dated Oct. 14, 2019 in European Patent Application No. 19159175.9, 11 pages.

(Continued)

*Primary Examiner* — Lunyi Lao
*Assistant Examiner* — Jarurat Suteerawongsa
(74) *Attorney, Agent, or Firm* — Oblon, McClelland, Maier & Neustadt, L.L.P.

(57) ABSTRACT

The disclosure relates to a display panel including a pixel array including a plurality of sub-pixels; through holes formed in gaps between the plurality of sub-pixels; and an infrared light detector including an emitter array and a receiver array, wherein the emitter array is configured to emit infrared light out through the through holes, and the receiver array is configured to receive infrared light emitted in through the through holes.

18 Claims, 18 Drawing Sheets

(56) References Cited

U.S. PATENT DOCUMENTS

2012/0075256 A1   3/2012  Izadi et al.
2018/0164411 A1*  6/2018  Townsend ............. G01S 7/4814
2018/0233113 A1   8/2018  Zhou

FOREIGN PATENT DOCUMENTS

| CN | 107273825 | 10/2017 |
| CN | 107275374 | 10/2017 |
| CN | 107329620 A | 11/2017 |
| CN | 107436685 | 12/2017 |
| CN | 107608454 | 1/2018 |

OTHER PUBLICATIONS

First Chinese Office Action with English translation dated Sep. 1, 2020 in counterpart Chinese Application No. 201810308210.5.

* cited by examiner

DISPLAY PANEL AND TERMINAL

CROSS-REFERENCE TO RELATED APPLICATION

This application is based upon and claims priority to Chinese Patent Application No. 201810308210.5, filed on Apr. 8, 2018, the entire contents of which are incorporated herein by reference.

TECHNICAL FIELD

The present disclosure generally relates to the technical field of electronics, and particularly to a display panel and a terminal.

BACKGROUND

Along with rapid development of electronic technology, functions of a terminal, such as a mobile phone and a tablet computer, become increasingly powerful. In order to sense a distance between a terminal and a user in real time, distance sensors, such as infrared optical displacement sensors, may be applied to the terminal to implement a distance detection function.

An opening may be formed in a part of a region of a panel of a terminal, other than a display region, and a distance sensor may be arranged near the opening. The distance sensor may emit and receive infrared light through the opening to perform distance detection.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a display panel including a pixel array including a plurality of sub-pixels; through holes formed in gaps between the plurality of sub-pixels; and an infrared light detector including an emitter array and a receiver array, wherein the emitter array is configured to emit infrared light out through the through holes, and the receiver array is configured to receive infrared light emitted in through the through holes.

In an example, at least part of orthographic projections of the emitter array and the receiver array on a plane where the pixel array is located falls within the pixel array.

In another example, an opaque material is arranged between the plurality of sub-pixels and the emitter array.

According to an aspect, the display panel further includes a pixel driver, wherein an opaque material is arranged between the pixel driver and the emitter array, and the pixel driver is configured to drive the plurality of sub-pixels to emit light.

In an example, an intersection of the infrared light emitted by the emitter array and the infrared light received by the receiver array is located between the pixel array and the infrared light detector.

In another example, a non-opaque material is arranged in the through holes.

In yet another example, the plurality of sub-pixels are sub-pixels located in an infrared light emission region of the emitter array and an infrared light receiving region of the receiver array.

In yet another example, the emitter array includes a plurality of emitters, and at least one emitter of the plurality of emitters is a Vertical Cavity Surface Emitting Laser (VCSEL).

In yet another example, the receiver array includes a plurality of receivers, and at least one receiver of the plurality of receivers is a Single Photon Avalanche Diode (SPAD).

In yet another example, the infrared light detector is arranged to form part of a detection circuit for a distance sensor.

Aspects of the disclosure also provide a terminal. The terminal includes a display panel that includes a pixel array including a plurality of sub-pixels; through holes formed in gaps between the plurality of sub-pixels; and an infrared light detector including an emitter array and a receiver array, wherein the emitter is configured to emit infrared light out through the through holes, and the receiver array is configured to receive infrared light emitted in through the through holes.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

For convenient understanding, an application scenario involved in the aspects of the present disclosure will be introduced before the aspects of the present disclosure are explained and described in detail.

Figure 1:
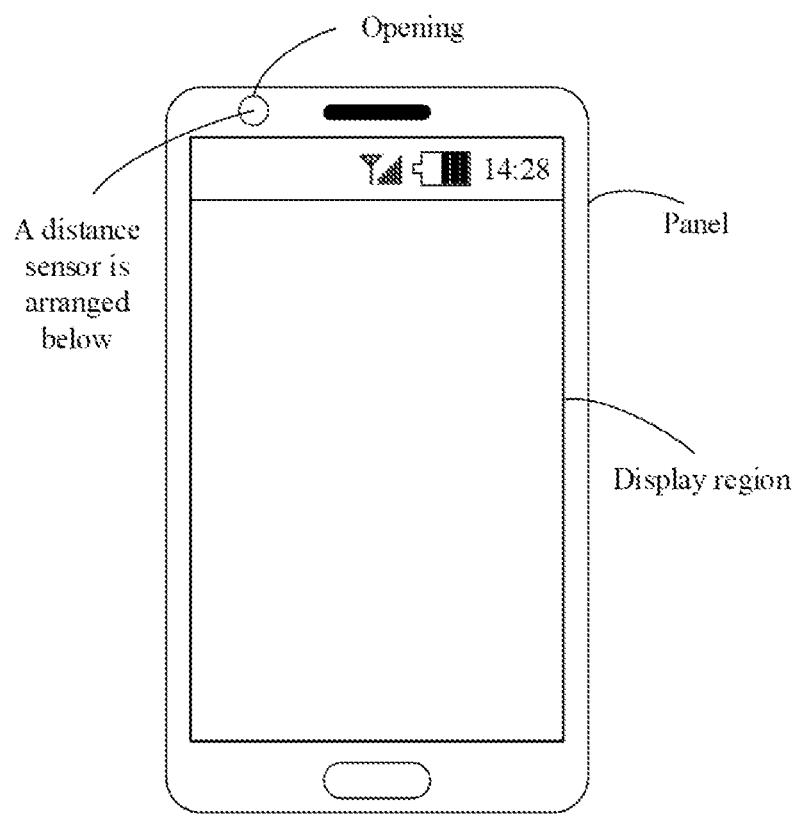
FIG. 1 is a structure diagram of a terminal, according to an exemplary aspect of the present disclosure.

Along with rapid development of an electronic technology, a function of a terminal such as a mobile phone and a tablet computer becomes more and more powerful. In order to sense a distance between a terminal and a user in real time, distance sensors represented by infrared optical displacement sensors are widely applied to terminals to realize a distance detection function. At present, as shown in FIG. 1, an opening may usually be formed in part of a region, except a display region, in a panel of a terminal, and a distance sensor is arranged below the opening. The distance sensor emits and receives infrared light through the opening and accordingly performs distance detection. Since the opening may occupy a certain area on the panel, an area, occupied by the display region, on the panel is limited, a screen-to-body ratio of the terminal is reduced, development of the terminal to a full-screen trend is hindered, and aesthetic appeal of the terminal is influenced. Therefore, the aspects of the present disclosure provide a display panel to increase the screen-to-body ratio of the terminal, improve display performance of the terminal and improve aesthetic appeal of the terminal.

Next, the display panel provided by the aspects of the present disclosure will be described in combination with the drawings in detail.

Figure 2A:
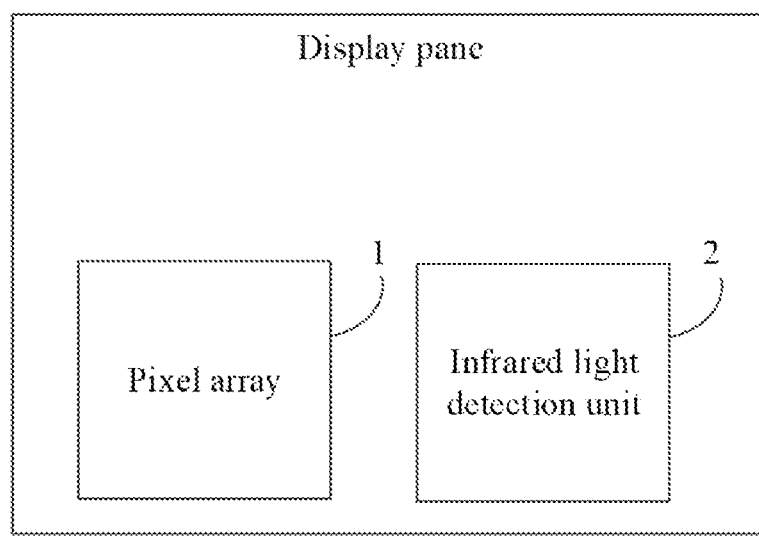
FIG. 2A is a structure diagram of a first display panel, according to an exemplary aspect of the present disclosure.

FIG. 2A is a structure diagram of a first display panel, according to an exemplary aspect. Referring to FIG. 2A, the display panel includes a pixel array 1 and an infrared light detection unit 2.

Figure 2B:
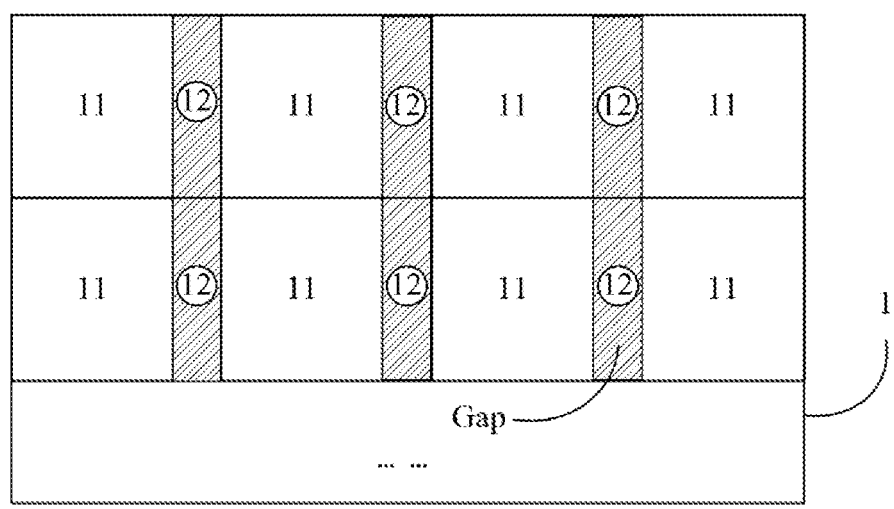
FIG. 2B is a structure diagram of a pixel array, according to an exemplary aspect of the present disclosure.

Herein, referring to FIG. 2B, the pixel array 1 includes multiple sub-pixels 11, and through holes 12 are formed in gaps between the multiple sub-pixels 11.

Figure 2C:
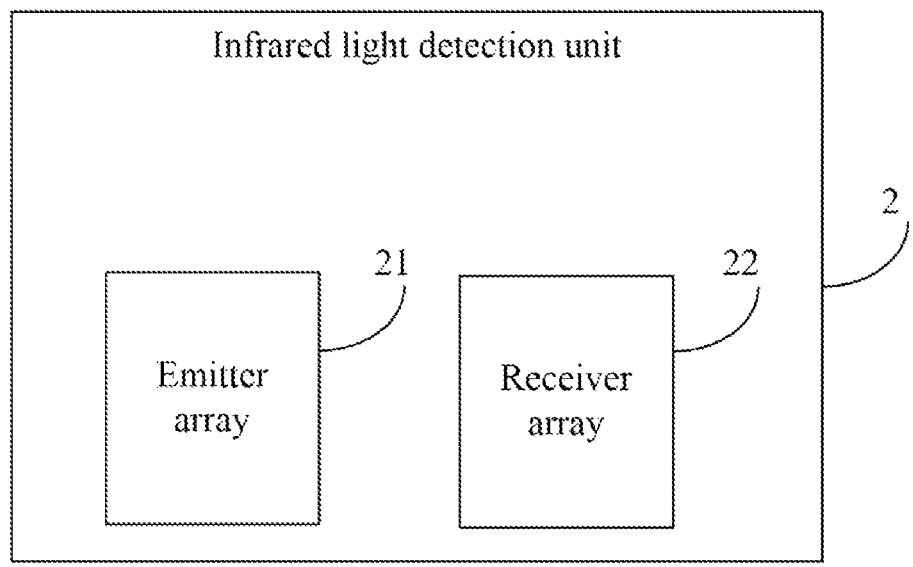
FIG. 2C is a structure diagram of a first infrared light detection unit, according to an exemplary aspect of the present disclosure.

Herein, referring to FIG. 2C, the infrared light detection unit 2 includes an emitter array 21 and a receiver array 22.

Figure 2D:
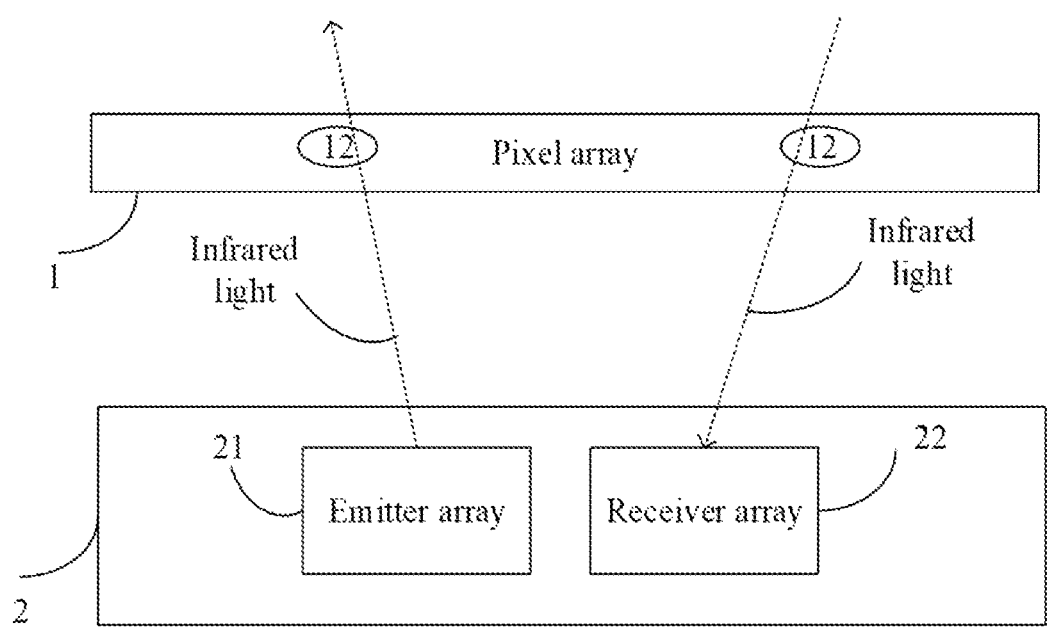
FIG. 2D is a structure diagram of infrared light passing through the through holes, according to an exemplary aspect of the present disclosure.

Herein, referring to FIG. 2D, infrared light emitted by the emitter array 21 is emitted out through the through holes 12, and the receiver array 22 receives infrared light emitted in through the through holes 12.

It is to be noted that the pixel array 1 is arranged to display a picture, the pixel array 1 includes multiple pixels and each pixel consists of multiple sub-pixels capable of emitting light in different colors. For example, each pixel may consist of an R sub-pixel capable of emitting red light, a G sub-pixel capable of emitting green light and a B sub-pixel capable of emitting blue light.

In addition, the gaps exist between every two adjacent sub-pixels 11 of the multiple sub-pixels 11 of the pixel array 1, the through holes 12 are formed in the gaps, and infrared light outside the display panel and the infrared light emitted by the infrared light detection unit (e.g., infrared light detector) 2 may pass through the through holes 12. During a practical application, the through holes 12 may be optical micropores, and the micropores may refer to tiny holes through which the infrared light may pass and which are invisible for human eyes. Moreover, a non-opaque material may also be arranged in the through holes 12, that is, the through holes 12 are filled with the non-opaque material to avoid the through holes 12 being blocked by another material in a process of preparing the display panel. The non-opaque material refers to a material through which the infrared light may pass. For example, the non-opaque material may be an optical fiber material.

It is to be noted that the infrared light detection unit 2 is arranged to detect a distance between the display panel and a user. The infrared light emitted by the emitter array 21 may be emitted from the display panel through the through holes 12, and the infrared light outside the display panel may be emitted into the display panel through the through holes 12 and received by the receiver array 22.

In addition, when the display panel is normally placed, the pixel array 1 may be located in an upper region in the display panel and the emitter array 21 and the receiver array 22 may be located in a lower region in the display panel, as long as it is ensured that both an infrared light emission path of the emitter array 21 and an infrared light receiving path of the receiver array 22 may pass through the through holes 12.

Herein, during distance detection of a terminal with the display panel, the infrared light emitted by the emitter array 21 may be emitted from the display panel after passing through the through holes 12, and the emitted-out infrared light may be reflected to form reflected light after contacting skin of the user, and the reflected light may be emitted into the display panel through the through holes 12 and then received by the receiver array 22. In such a case, the terminal may perform distance detection according to the infrared light emitted by the emitter array 21 and the reflected light, received by the receiver array 22, of the infrared light. Since no opening is required to be specially formed in part of a region, except a display region, in the display panel, the display panel may be prevented from being additionally occupied by the opening and may have an unlimited area occupied by the display region. In this way, a screen-to-body ratio of the terminal may further be increased, display performance of the terminal may be improved, and aesthetic appeal of the terminal may be improved.

It is to be noted that the infrared light detection unit 2 is arranged to form part of a detection circuit for a distance sensor. The distance sensor is arranged to detect a distance between it and the user, and in such a case, the infrared light detection unit 2 may detect the distance between the display panel and the user through the infrared light.

Figure 2E:
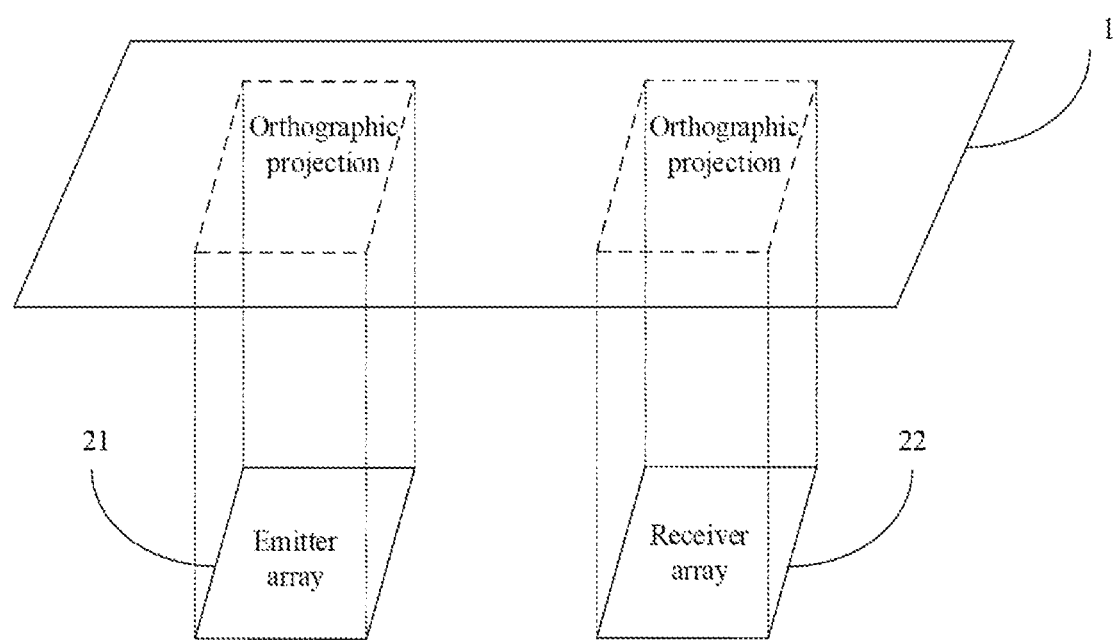
FIG. 2E is a structure diagram of a second display panel, according to an exemplary aspect of the present disclosure.

Herein, referring to FIG. 2E, at least part of orthographic projections of the emitter array 21 and the receiver array 22 on a plane where the pixel array 1 is located falls within the pixel array 1.

It is to be noted that the orthographic projections of the emitter array 21 and the receiver array 22 on the plane where the pixel array 1 is located may partially or completely fall within the pixel array 1, and in such a case, all of the emitter array 21, the receiver array 22 and the pixel array 1 may be located in the same region in the display panel. Since the pixel array 1 is located in the display region arranged to display the picture in the display panel, both of the emitter array 21 and the receiver array 22 may be located in the display region in the display panel. Therefore, part of the region, except the display region, in the display panel may be effectively prevented from being occupied by the emitter array 21 and the receiver array 22, an area, occupied by the display region, on the display panel may further be enlarged, the screen-to-body ratio may be increased, and the display performance may be improved.

Figure 2F:
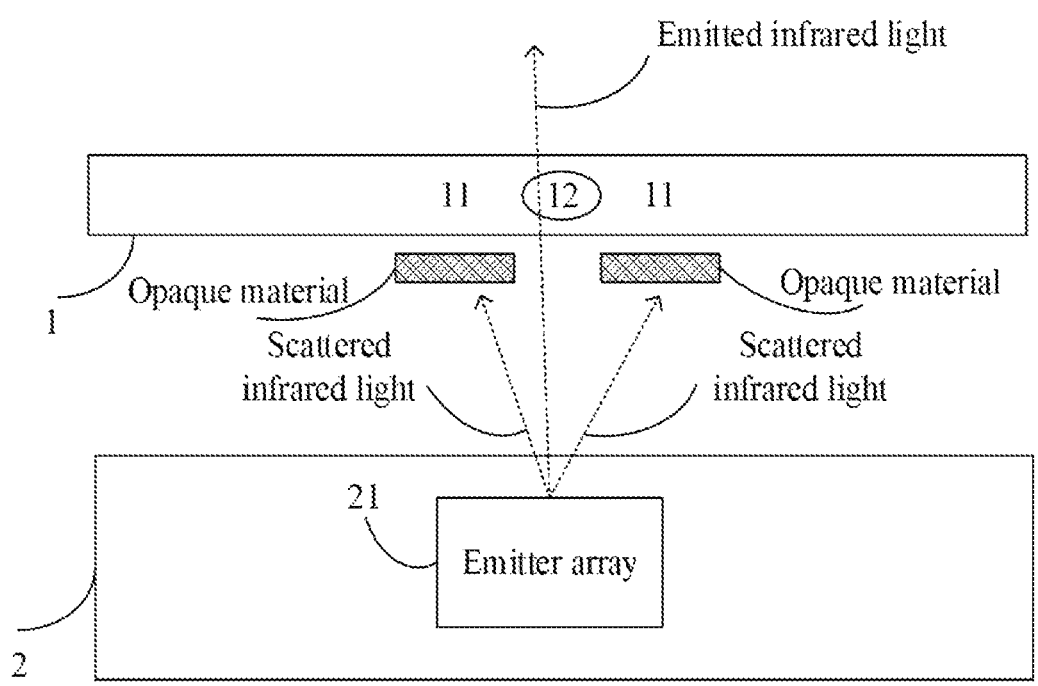
FIG. 2F is a structure diagram of a third display panel, according to an exemplary aspect of the present disclosure.

Herein, referring to FIG. 2F, an opaque material is arranged between the multiple sub-pixels 11 and the emitter array 21.

It is to be noted that the opaque material refers to a material through which the infrared light may not pass. For example, the opaque material may be a black painting and black rubber. The opaque material is used for preventing the infrared light emitted by the emitter array 21 from being scattered onto the multiple sub-pixels 11, and the opaque material may not hinder the infrared light emitted by the emitter array 21 from being emitted from the display panel through the through holes 12. That is, the opaque material may be arranged outside the infrared light emission path between the emitter array 21 and the through holes 12 and arranged on an infrared light scattering path between the emitter array 21 and the multiple sub-pixels 11. For example, the opaque material may be arranged at a certain position between the multiple sub-pixels 11 and the emitter array 21 and a lower surface of the multiple sub-pixels 11 may also be directly coated with the opaque material.

In addition, when the multiple sub-pixels 11 are not controlled to emit light, if the infrared light emitted by the emitter array 21 is scattered onto some of the multiple sub-pixels 11, energy of the infrared light may cause these sub-pixels 11 to emit light, and then these sub-pixels 11 are turned on, thereby forming bright spots in the pixel array 1 to bring influence to use of the user. For this condition, the opaque material may be arranged between the multiple sub-pixels 11 and the emitter array 21, so that influence of the infrared light emitted by the emitter array 21 on the display performance of the pixel array 1 may be effectively avoided, and a user experience may be improved.

Figure 2G:
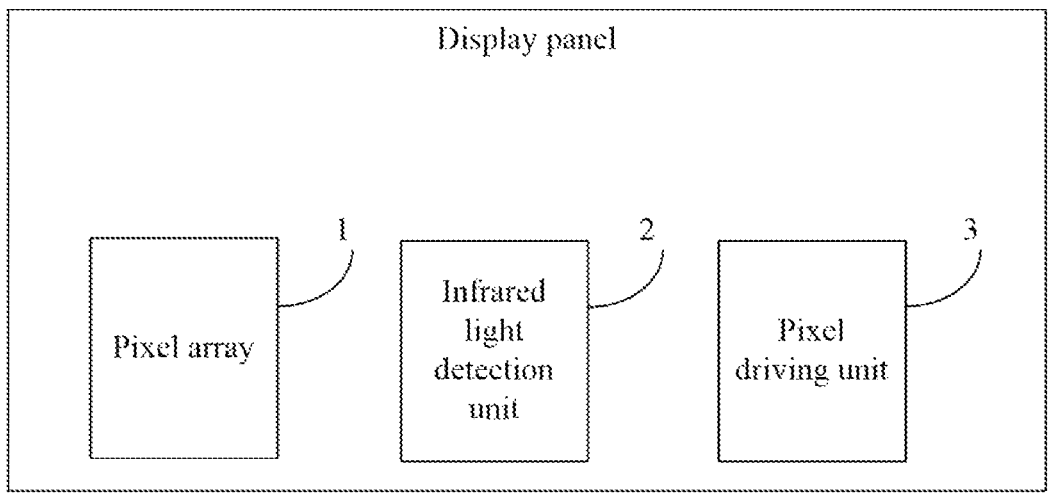
FIG. 2G is a structure diagram of a fourth display panel, according to an exemplary aspect of the present disclosure.

Herein, referring to FIG. 2G the display panel further includes a pixel driving unit (e.g., pixel driver) 3.

Figure 2H:
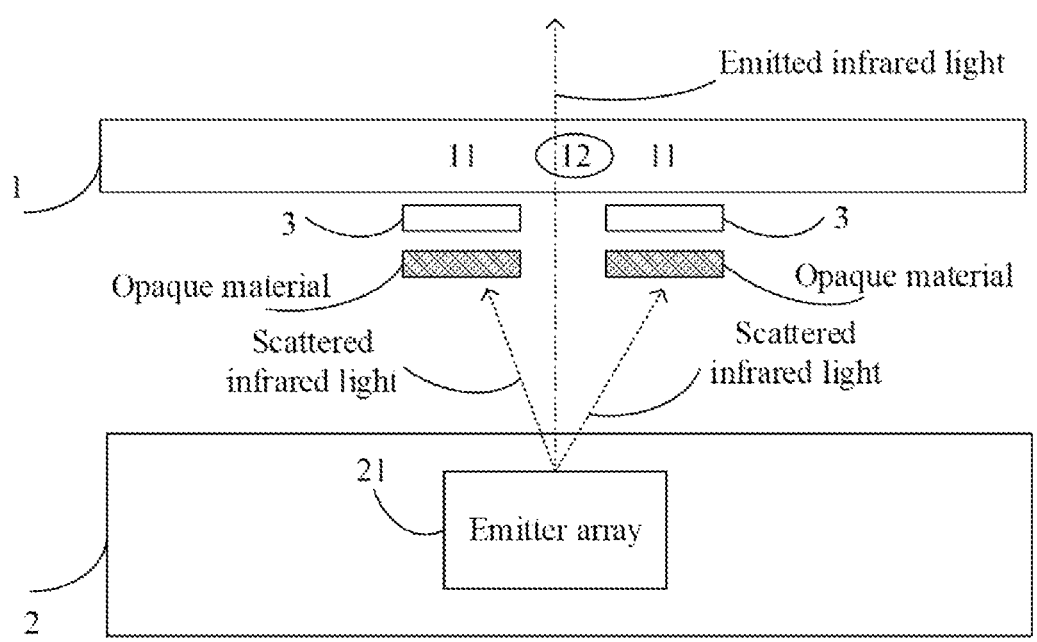
FIG. 2H is a structure diagram of a fifth display panel, according to an exemplary aspect of the present disclosure.

Herein, referring to FIG. 2H, the opaque material is arranged between the pixel driving unit 3 and the emitter array 21.

It is to be noted that the pixel driving unit 3 is arranged to drive the multiple sub-pixels 11 to emit light. For example, the pixel driving unit 3 may include a Thin Film Transistor (TFT) corresponding to each sub-pixel 11 of the multiple sub-pixels, and each pixel 11 may emit light through its corresponding TFT. For example, a voltage may be applied to a gate of the TFT corresponding to a certain sub-pixel 11 to turn on the TFT, and after the TFT is turned on, a voltage is applied to a source of the TFT to enable the sub-pixel 11 to emit light.

In addition, the opaque material is used for preventing the infrared light emitted by the emitter array 21 from being scattered onto the pixel driving unit 3, and the opaque material may not hinder the infrared light emitted by the emitter array 21 from being emitted from the display panel through the through holes 12. That is, the opaque material may be arranged outside the infrared light emission path between the emitter array 21 and the through holes 12 and arranged on the infrared light scattering path between the emitter array 21 and the pixel driving unit 3. For example, the opaque material may be arranged at a certain position between the pixel driving unit 3 and the emitter array 21 and a lower surface of the pixel driving unit 3 may also be directly coated with the opaque material.

Moreover, when the pixel driving unit 3 is not started, if the infrared light emitted by the emitter array 21 is scattered onto the pixel driving unit 3, energy of the infrared light may start the pixel driving unit 3 to control some sub-pixels 11 to emit light, and then these sub-pixels 11 are turned on, thereby forming bright spots in the pixel array 1 to bring influence to use of the user. For this condition, in the aspect of the present disclosure, the opaque material may be arranged between the pixel driving unit 3 and the emitter array 21, so that the influence of the infrared light emitted by the emitter array 21 on the display performance of the pixel array 1 may be effectively avoided, and the user experience may be improved.

It is to be noted that the pixel driving unit 3 may be totally located below the multiple sub-pixels 11 and is located between the multiple sub-pixels 11 and the emitter array 21, and in such a case, the opaque material may only be arranged between the pixel driving unit 3 and the emitter array 21 to simultaneously avoid the infrared light emitted by the emitter array 21 being scattered onto the multiple sub-pixels 11 and the pixel driving unit 3. Or, the pixel driving unit 3 may also be partially located below the multiple sub-pixels 11, and in such a case, the opaque material may be arranged between the pixel driving unit 3 and the emitter array 21 and between the multiple sub-pixels 11 and the emitter array 21 to avoid the infrared light emitted by the emitter array 21 being scattered onto the multiple sub-pixels 11 and the pixel driving unit 3.

Figure 2I:
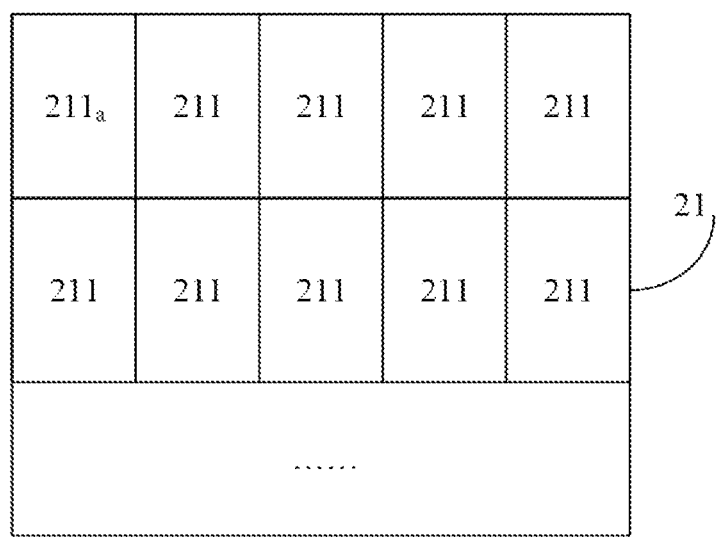
FIG. 2I is a structure diagram of an emitter array, according to an exemplary aspect of the present disclosure.

Herein, referring to FIG. 2I, the emitter array 21 includes multiple emitters 211.

It is to be noted that each emitter 211 in the multiple emitters 211 is arranged to emit the infrared light and the multiple emitters 211 may emit the infrared light in different directions. For example, at least one emitter $211_a$ in the multiple emitters 21 may be a VCSEL, a light-emitting diode, a laser diode and the like.

In addition, when the emitters 211 are VCSELs, light emitted by the emitters 211 is laser, and the laser is relatively strong in energy and unlikely to diverge, so that the vast majority of the infrared light emitted by the emitter array 21 may be emitted from the display panel through the through holes 12. Moreover, the VCSELs are small in size and low in cost, and may be easily integrated into the emitter array 21.

Figure 2J:
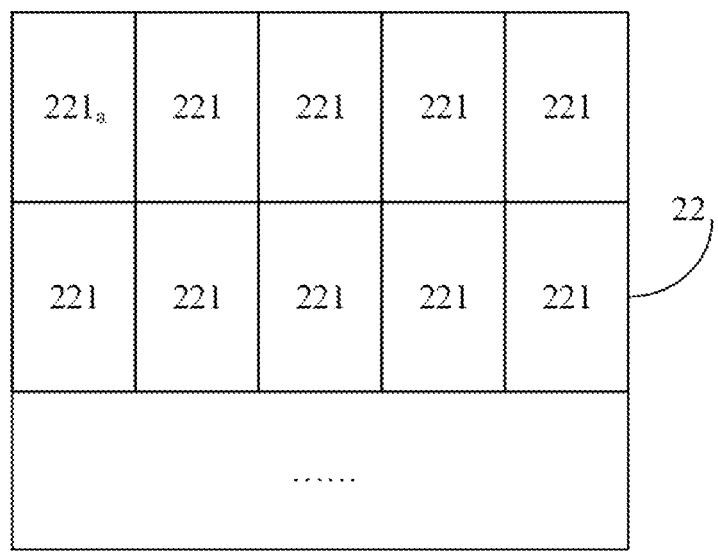
FIG. 2J is a structure diagram of a receiver array, according to an exemplary aspect of the present disclosure.

Herein, referring to FIG. 2J, the receiver array 22 includes multiple receivers 221.

It is to be noted that each receiver 221 in the multiple receivers 221 is arranged to receive the infrared light and the multiple receivers 221 may receive the infrared light in different directions. At least one receiver $221_a$ in the multiple receivers 221 may be a SPAD and a photo diode.

In addition, when the receivers 221 are SPADs, the SPADs may receive weak infrared light, so that infrared light receiving accuracy of the receiver array 22 may be improved.

Figure 2K:
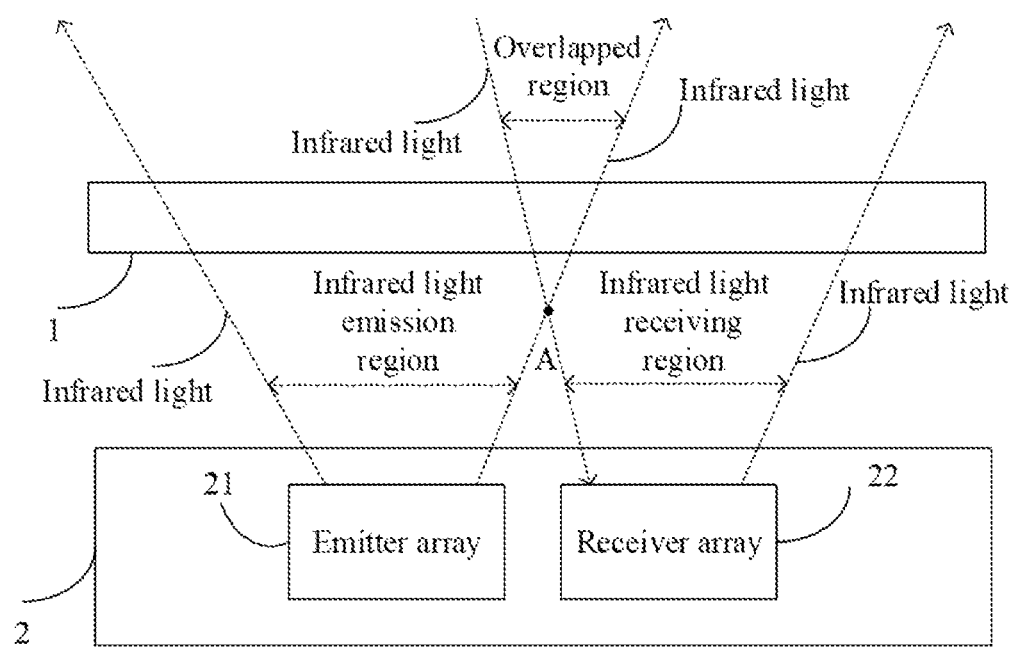
FIG. 2K is a structure diagram of a sixth display panel, according to an exemplary aspect of the present disclosure.

Herein, referring to FIG. 2K, an intersection A of the infrared light emitted by the emitter array 21 and the infrared light received by the receiver array 22 is located between the pixel array 1 and the infrared light detection unit 2.

It is to be noted that the emitter array 21 may include multiple emitters 211, the multiple emitters 211 may emit the infrared light in different directions, the receiver array 22 may also include multiple receivers 221 and the multiple receivers 221 may receive the infrared light in different directions. When the intersection A of the infrared light emitted by the emitter array 21 and the infrared light received by the receiver array 22 is located between the pixel array 1 and the infrared light detection unit 2, a range of an overlapped region of an infrared light emission region of the emitter array 21 and an infrared light receiving region of the receiver array 22 is relatively wide, and the reflected light of the infrared light emitted by the emitter array 21 in the overlapped region may be received by the receiver array 22. That is, when the user is in the overlapped region, the distance between the display panel and the user may be accurately detected through the emitter array 21 and the receiver array 22, and a detection range is relatively wide.

Figure 2L:
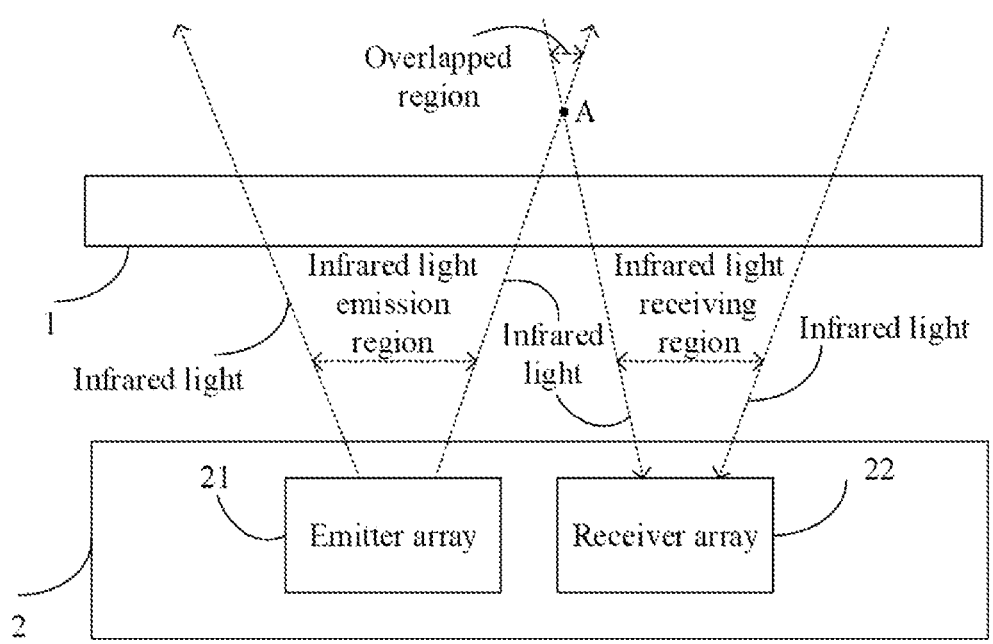
FIG. 2L is a structure diagram of a seventh display panel, according to an exemplary aspect of the present disclosure.
Figure 2M:
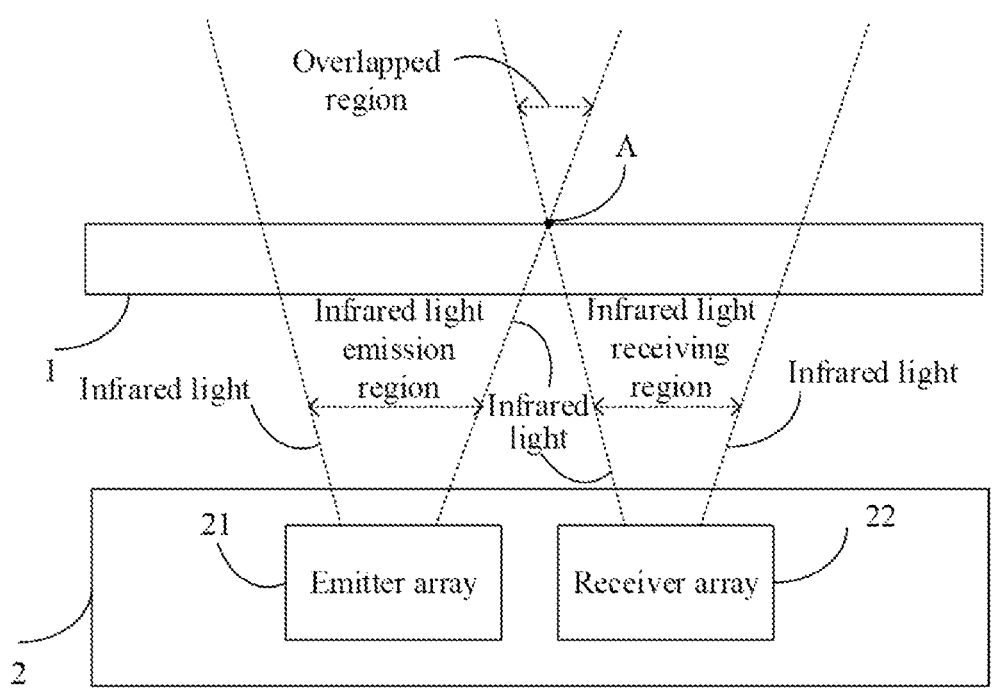
FIG. 2M is a structure diagram of an eighth display panel, according to an exemplary aspect of the present disclosure.

Of course, during a practical application, as shown in FIG. 2L, the intersection A of the infrared light emitted by the emitter array 21 and the infrared light received by the receiver array 22 may also be located above the pixel array 1; or, as shown in FIG. 2M, the intersection A of the infrared light emitted by the emitter array 21 and the infrared light received by the receiver array 22 may also be located in the pixel array 1. There are no limits made thereto in the aspect of the present disclosure.

Figure 2N:
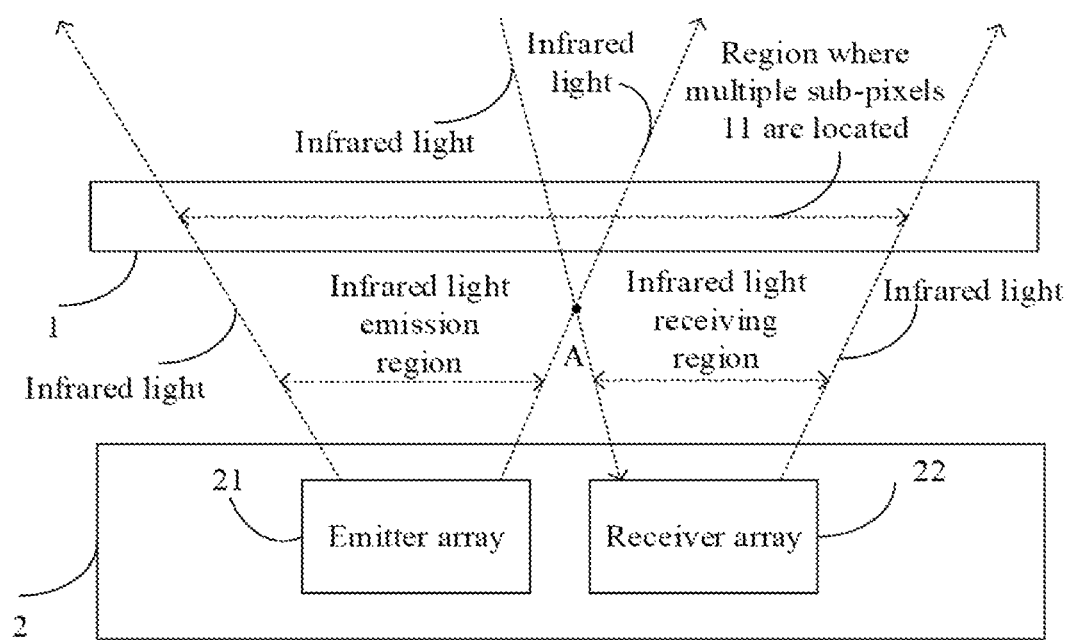
FIG. 2N is a structure diagram of a ninth display panel, according to an exemplary aspect of the present disclosure.

Herein, referring to FIG. 2N, the multiple sub-pixels 11 are sub-pixels located in the infrared light emission region of the emitter array 21 and the infrared light receiving region of the receiver array 22.

It is to be noted that the through holes 12 are formed to enable the infrared light emitted by the emitter array 21 and the infrared light received by the receiver array 22 to pass through the display panel. Therefore, the through holes 12 are required to be formed in the gaps between the sub-pixels 11 in the infrared light emission region of the emitter array 21 and the infrared light receiving region of the receiver array 22. That is, the multiple sub-pixels 11 are sub-pixels located in the infrared light emission region of the emitter array 21 and the infrared light receiving region of the receiver array 22.

In the aspect of the present disclosure, the display panel includes the pixel array and the infrared light detection unit, the through holes are formed in the gaps between the multiple sub-pixels of the pixel array, the infrared light emitted by the emitter array of the infrared light detection unit may be emitted out through the through holes, and the receiver array of the infrared light detection unit may receive the infrared light emitted in through the through holes. During distance detection of the terminal with the display panel, no opening is required to be specially formed in part of the region, except the display region, in the display panel, and instead, distance detection may be performed directly through the emitter array and receiver array in the display panel, so that the display panel may be prevented from being additionally occupied by the opening to ensure the unlimited area, occupied by the display region, on the display panel, the screen-to-body ratio of the terminal may further be increased, the display performance of the terminal may be improved, and aesthetic appeal of the terminal may be improved.

Figure 3:
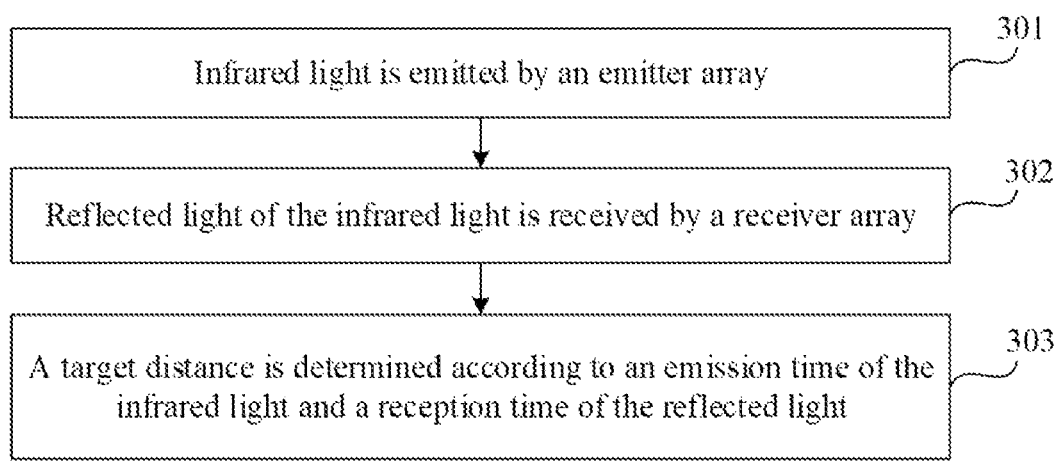
FIG. 3 is a flow chart showing a distance sensing method, according to an exemplary aspect of the present disclosure.

FIG. 3 is a flow chart showing a distance sensing method, according to an exemplary aspect. As shown in FIG. 3, the method is applied to a terminal with any display panel shown in FIG. 2A-FIG. 2N. The method includes the following operations.

In 301, infrared light is emitted by an emitter array.

It is to be noted that the infrared light emitted by the emitter array may be emitted out from the display panel after passing through the through holes.

In 302, reflected light of the infrared light is received by a receiver array.

It is to be noted that the infrared light emitted by the emitter array may be reflected to form the reflected light after contacting skin of a user and the reflected light may be emitted into the display panel through the through holes and then received by the receiver array.

In 303, a target distance is determined according to an emission time of the infrared light and a reception time of the reflected light.

It is to be noted that the target distance refers to a distance between the terminal and the user.

Herein, an implementation process of determining the target distance according to the emission time of the infrared light and the reception time of the reflected light may be as follows: the emission time of the infrared light is subtracted from the reception time of the reflected light to obtain a propagation duration of the infrared light, a propagation velocity of the infrared light is multiplied by the propagation duration of the infrared light to obtain a propagation distance of the infrared light, and the propagation distance of the infrared light is divided by 2 to obtain the target distance.

Furthermore, after the target distance is determined, whether the target distance is longer than a preset distance or not may also be judged. When the target distance is longer than the preset distance, it is indicated that the distance between the user and the terminal is relatively long, and in such a case, the terminal may be controlled to enter a screen-on state, so that an operation of the user over a display region in the display panel is facilitated. When the target distance is not longer than the preset distance, it is indicated that the distance between the user and the terminal is relatively short, and in such a case, the terminal may be controlled to enter a screen-off state, so that a misoperation when the user gets close to the display region in the display panel may be avoided, for example, the user may be prevented from accidentally touching a hang-up button displayed in the display region in the display panel to hang up the phone when making a call with the terminal held close to the face, and a better user experience may be brought to the user.

It is to be noted that the preset distance may be preset according to different requirements and the preset distance may be set to be relatively short. For example, the preset distance may be 1 cm, 2 cm and the like.

In the aspect of the present disclosure, the infrared light is emitted through the emitter array, then the reflected light of the infrared light may be received through the receiver array, and then the target distance may be determined according to the emission time of the infrared light and the reception time of the reflected light. Since both of the infrared light emitted by the emitter array and the infrared light received by the receiver array passes through the through holes in gaps between multiple sub-pixels of a pixel array, during distance detection of the terminal, no opening is required to be specially formed in part of a region, except the display region, in the display panel, the display panel may be prevented from being additionally occupied by the opening and may have an unlimited area occupied by the display region. In this way, a screen-to-body ratio of the terminal may further be increased, display performance of the terminal may be improved, and aesthetic appeal of the terminal may be improved.

Figure 4:
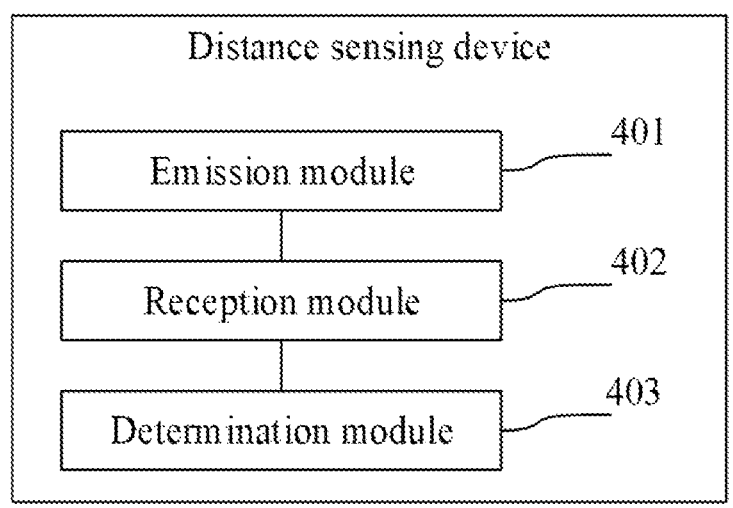
FIG. 4 is a block diagram illustrating a distance sensing device, according to an exemplary aspect of the present disclosure.

FIG. 4 is a block diagram illustrating a distance sensing device, according to an exemplary aspect. Referring to FIG. 4, the device is applied to a terminal with any display panel shown in FIG. 2A-FIG. 2N. The device includes an emission module 401, a reception module 402 and a determination module 403.

The emission module 401 is arranged to emit infrared light through an emitter array.

The reception module 402 is arranged to receive reflected light of the infrared light through a receiver array.

The determination module 403 is arranged to determine a target distance according to an emission time of the infrared light and a reception time of the reflected light.

In the aspect of the present disclosure, the infrared light is emitted through the emitter array, then the reflected light of the infrared light may be received through the receiver array, and then the target distance may be determined according to the emission time of the infrared light and the reception time of the reflected light. Since both of the infrared light emitted by the emitter array and the infrared light received by the receiver array passes through the through holes in gaps between multiple sub-pixels of a pixel array, during distance detection of the terminal, no opening is required to be specially formed in part of a region, except a display region, in the display panel, the display panel may be prevented from being additionally occupied by the opening and may have an unlimited area occupied by the display region. In this way, a screen-to-body ratio of the terminal may further be increased, display performance of the terminal may be improved, and aesthetic appeal of the terminal may be improved.

With respect to the device in the above aspect, the specific manners for performing operations for individual modules therein have been described in detail in the aspect regarding the method, which will not be elaborated herein.

Figure 5:
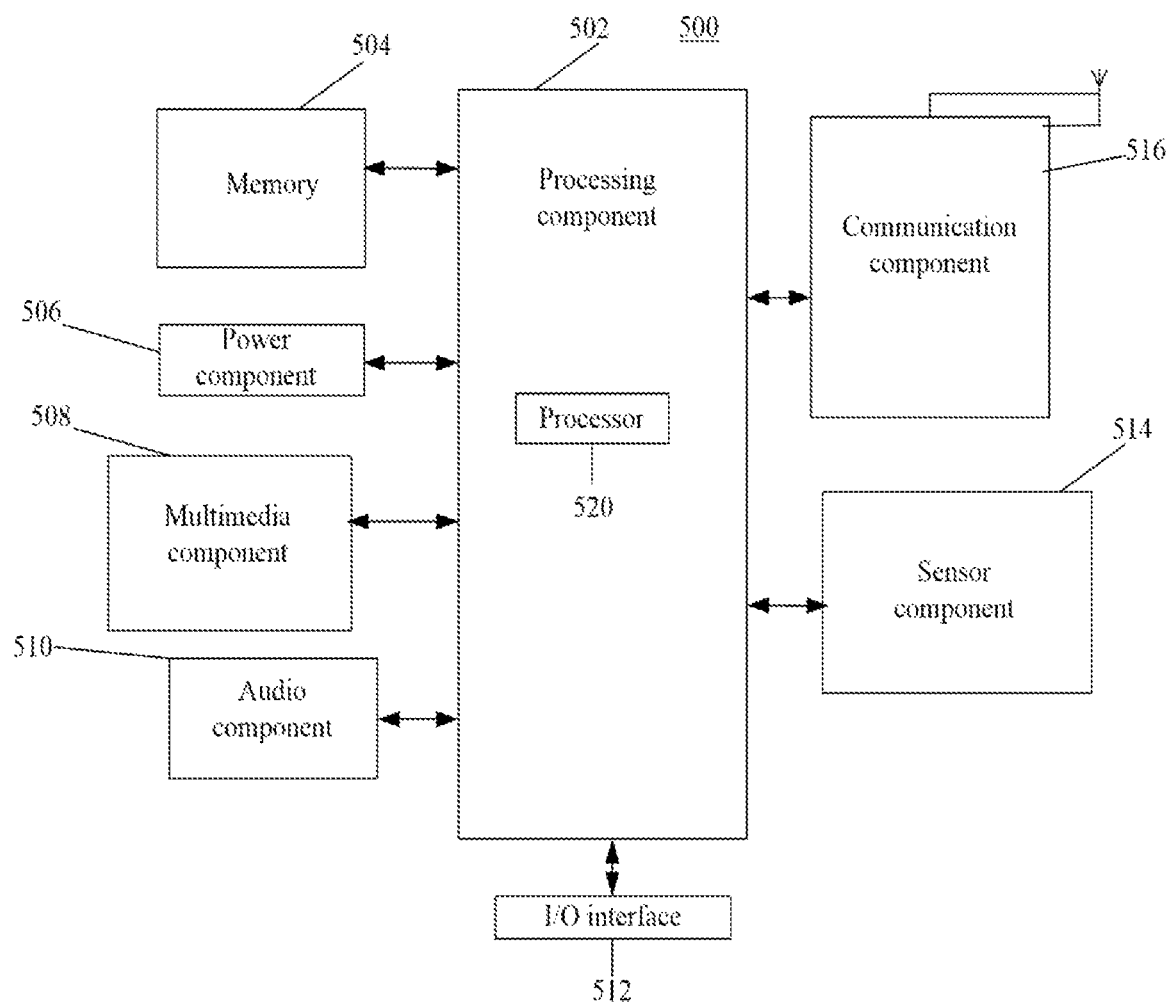
FIG. 5 is a block diagram illustrating another distance sensing device, according to an exemplary aspect of the present disclosure.

FIG. 5 is a block diagram illustrating a distance sensing device 500, according to an exemplary aspect. For example, the device 500 may be a mobile phone, a computer, a digital broadcast terminal, a messaging device, a gaming console, a tablet, a medical device, exercise equipment, a personal digital assistant and the like.

Referring to FIG. 5, the device 500 may include one or more of the following components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the operations in the abovementioned method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is arranged to store various types of data to support the operation of the device 500. Examples of such data include instructions for any application programs or methods operated on the device 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with generation, management and distribution of power for the device 500.

The multimedia component 508 includes a screen providing an output interface between the device 500 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some aspects, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is arranged to output and/or input an audio signal. For example, the audio component 510 includes a Microphone (MIC), and the MIC is arranged to receive an external audio signal when the device 500 is in the operation mode, such as a call mode, a recording mode and a voice recognition mode. The received audio signal may further be stored in the memory 504 or sent through the communication component 516. In some aspects, the audio component 510 further includes a speaker arranged to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button and a locking button.

The sensor component 514 includes one or more sensors arranged to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor arranged to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some aspects, the sensor component 514 may also include an acceleration sensor, a gyroscope sensor, a magnetic sensor, a pressure sensor or a temperature sensor.

The communication component 516 is arranged to facilitate wired or wireless communication between the device 500 and other equipment. The device 500 may access a communication-standard-based wireless network, such as a Wireless Fidelity (WiFi) network, a 2nd-Generation (2G) or 3rd-Generation (3G) network or a combination thereof. In an exemplary aspect, the communication component 516 receives a broadcast signal or broadcast associated information from an external broadcast management system through a broadcast channel. In an exemplary aspect, the communication component 516 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary aspect, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is arranged to execute a display panel application method provided in the aspect shown in FIG. 3.

In an exemplary aspect, there is also provided a non-transitory computer-readable storage medium including an instruction, such as the memory 504 including an instruction, and the instruction may be executed by the processor 520 of the device 500 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

According to a non-transitory computer-readable storage medium, when an instruction in the storage medium is executed by a processor of a terminal, the mobile terminal may execute a display panel application method, the method is applied to a terminal with any display panel in FIG. 2A-FIG. 2N, and the method includes that:

infrared light is emitted through an emitter array;

reflected light of the infrared light is received through a receiver array; and a target distance is determined according to an emission time of the infrared light and a reception time of the reflected light.

In the aspect of the present disclosure, the infrared light is emitted through the emitter array, then the reflected light of the infrared light may be received through the receiver array, and then the target distance may be determined according to the emission time of the infrared light and the reception time of the reflected light. Since both of the infrared light emitted by the emitter array and the infrared light received by the receiver array passes through the through holes in gaps between multiple sub-pixels of a pixel array, during distance detection of the terminal, no opening is required to be specially formed in part of a region, except a display region, in the display panel, the display panel may be prevented from being additionally occupied by the opening and may have an unlimited area occupied by the display region. In this way, a screen-to-body ratio of the terminal may further be increased, display performance of the terminal may be improved, and aesthetic appeal of the terminal may be improved.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A display panel, comprising:
   a pixel array including a plurality of sub-pixels;
   through holes formed in gaps between the plurality of sub-pixels; and
   an infrared light detector including an emitter array and a receiver array,
   wherein the emitter array is configured to emit infrared light out through the through holes, and the receiver array is configured to receive infrared light emitted in through the through holes,
   wherein the emitter array and the receiver array are separated from one another, and an edge of an infrared light emission region of the emitter array and an adjacent edge of an infrared light receiving region of the receiver array are configured in such a way that a point of intersection of the two edges is located between the pixel array and the infrared light detector,
   wherein each through hole is between two subpixels, and
   wherein a pixel driver is arranged either below or behind the plurality of subpixels and between the through holes.

2. The display panel of claim 1, wherein at least part of orthographic projections of the emitter array and the receiver array on a plane where the pixel array is located falls within the pixel array.

3. The display panel of claim 1, wherein an opaque material is arranged between the plurality of sub-pixels and the emitter array.

4. The display panel of claim 1, wherein an opaque material is arranged between the pixel driver and the emitter array, and the pixel driver is configured to drive the plurality of sub-pixels to emit light.

5. The display panel of claim 1, wherein a non-opaque material is arranged in the through holes.

6. The display panel of claim 1, wherein the plurality of sub-pixels are sub-pixels located in an infrared light emission region of the emitter array and the infrared light receiving region of the receiver array.

7. The display panel of claim 1, wherein the emitter array includes a plurality of emitters, and at least one emitter of the plurality of emitters is a Vertical Cavity Surface Emitting Laser (VCSEL).

8. The display panel of claim 1, wherein the receiver array includes a plurality of receivers, and at least one receiver of the plurality of receivers is a Single Photon Avalanche Diode (SPAD).

9. The display panel of claim 1, wherein the infrared light detector is arranged to form part of a detection circuit for a distance sensor.

10. A terminal, comprising:
a display panel including:
a pixel array including a plurality of sub-pixels;
through holes formed in gaps between the plurality of sub-pixels; and
an infrared light detector including an emitter array and a receiver array,
wherein the emitter is configured to emit infrared light out through the through holes, and the receiver array is configured to receive infrared light emitted in through the through holes,
wherein the emitter array and the receiver array are separated from one another, and an edge of an infrared light emission region of the emitter array and an adjacent edge of an infrared light receiving region of the receiver array are configured in such a way that a point of intersection of the two edges is located between the pixel array and the infrared light detector,
wherein each through hole is between two subpixels, and
wherein a pixel driver is arranged either below or behind the plurality of subpixels and between the through holes.

11. The terminal of claim 10, wherein at least part of orthographic projections of the emitter array and the receiver array on a plane where the pixel array is located falls within the pixel array.

12. The terminal of claim 10, wherein an opaque material is arranged between the plurality of sub-pixels and the emitter array.

13. The terminal of claim 10, wherein an opaque material is arranged between the pixel driver and the emitter array, and the pixel driver is configured to drive the plurality of sub-pixels to emit light.

14. The terminal of claim 10, wherein a non-opaque material is arranged in the through holes.

15. The terminal of claim 10, wherein the plurality of sub-pixels are sub-pixels located in an infrared light emission region of the emitter array and the infrared light receiving region of the receiver array.

16. The terminal of claim 10, wherein the emitter array includes a plurality of emitters, and at least one emitter of the plurality of emitters is a Vertical Cavity Surface Emitting Laser (VCSEL).

17. The terminal of claim 10, wherein the receiver array includes a plurality of receivers, and at least one receiver of the plurality of receivers is a Single Photon Avalanche Diode (SPAD).

18. The terminal of claim 10, wherein the infrared light detector is arranged to form part of a detection circuit for a distance sensor.

* * * * *